(12) United States Patent
Ishida et al.

(10) Patent No.: US 6,858,328 B1
(45) Date of Patent: Feb. 22, 2005

(54) MASTER INFORMATION SUPPORT

(75) Inventors: Tatsuaki Ishida, Osaka (JP); Kiyokazu Tohma, Osaka (JP); Keizo Miyata, Osaka (JP); Yoriko Takai, Osaka (JP); Taizou Hamada, Osaka (JP); Hiroshi Ryonai, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/646,139

(22) PCT Filed: Mar. 18, 1999

(86) PCT No.: PCT/JP99/01376

§ 371 (c)(1),
(2), (4) Date: Sep. 13, 2000

(87) PCT Pub. No.: WO99/49457

PCT Pub. Date: Sep. 30, 1999

(30) Foreign Application Priority Data

Mar. 20, 1998 (JP) ............................................. 10-072146

(51) Int. Cl.[7] ............................. G11B 5/66; G11B 5/70; G11B 5/86; H01F 1/00; B05D 5/12
(52) U.S. Cl. ............................. 428/694 T; 428/694 TR; 428/694 TC; 428/694 TP; 428/900; 427/548; 427/599; 427/130; 360/17
(58) Field of Search ............................ 428/694 T, 900, 428/694 TR, 694 TC, 694 TP, 694 SG; 360/135, 17; 427/547–548, 598–599, 130

(56) References Cited

U.S. PATENT DOCUMENTS

| | | | |
|---|---|---|---|
| 3,381,085 A | 4/1968 | Johnson et al. | 360/17 |
| 3,641,280 A | 2/1972 | Browder | 179/100.2 E |
| 3,844,907 A | 10/1974 | Kitamoto et al. | 204/12 |
| 3,869,711 A | 3/1975 | Bernard et al. | 360/17 |

(List continued on next page.)

FOREIGN PATENT DOCUMENTS

| | | |
|---|---|---|
| EP | 0 131 895 | 1/1985 |
| EP | 0 655 734 | 5/1995 |
| EP | 0 915 456 | 5/1999 |

(List continued on next page.)

OTHER PUBLICATIONS

Yamamoto et al., "MR Head Response from Arrays of Lithographically Patterned Perpendicular Nickel Columns", Sep. 1997, IEEE Tran. Magn., vol. 33, No. 5, pp. 3016–3018.*

C. Denis Mee et al. *Magnetic Recording* (vol. III: Video, Audio, and Instrumentation Recording), Chapter 2, pp. 94–105.

Tanaka et al., Characterization of Magnetizing Process for Pro–Embossed Servo Pattern of Plastic Hard Disks, IEEE Transaction on Magnetics, pp 4209–4211.

International Preliminary Examination Report.

*Primary Examiner*—Holly Rickman
(74) *Attorney, Agent, or Firm*—Merchant & Gould P.C.

(57) ABSTRACT

A master information carrier with excellent durability is provided, for the use of static and a real lump-sum recording of digital information signals on magnetic recording medium. The master information carrier comprises a non-magnetic substrate on which a ferromagnetic film is disposed with an embossed pattern. Protrusions of the embossed pattern correspond to a disposition of the digital information signals.

Recessed portions of the embossed pattern of the ferromagnetic film are filled with non-magnetic solid material. Alternately, A non-magnetic substrate has an embossed pattern and recessed portions of the embossed pattern correspond to a disposition of the digital information signals. A ferromagnetic film is filled in the recessed portions of the embossed pattern.

14 Claims, 7 Drawing Sheets

U.S. PATENT DOCUMENTS

| | | | |
|---|---|---|---|
| 3,982,276 A | 9/1976 | Roos | 360/17 |
| 4,071,869 A | 1/1978 | Feierabend et al. | 360/135 |
| 4,277,806 A | 7/1981 | Jeffers et al. | 360/16 |
| 4,363,038 A | 12/1982 | Fayling | 360/17 |
| 4,422,106 A | 12/1983 | Sawazaki | 360/17 |
| 4,525,828 A | 6/1985 | Higashiyama et al. | 369/111 |
| RE32,464 E * | 7/1987 | Aine | 428/622 |
| 4,725,899 A | 2/1988 | Gardner | 360/15 |
| 4,911,967 A | 3/1990 | Lazzari | 428/64 |
| 4,912,585 A | 3/1990 | Belser et al. | 360/135 |
| 5,032,931 A | 7/1991 | Suzuki et al. | 360/17 |
| 5,049,942 A | 9/1991 | Bujese | 355/272 |
| 5,121,258 A | 6/1992 | Chi et al. | 360/17 |
| 5,296,995 A | 3/1994 | Yonezawa et al. | 360/135 |
| 5,303,092 A | 4/1994 | Noda | 360/17 |
| 5,353,169 A | 10/1994 | Jeffers et al. | 360/16 |
| 5,426,535 A | 6/1995 | Bigelow et al. | 360/16 |
| 5,585,989 A | 12/1996 | Kuromiya et al. | 360/135 |
| 5,748,421 A | 5/1998 | Taki et al. | 360/135 |
| 5,898,553 A | 4/1999 | Oyanagi et al. | 360/135 |
| 5,991,104 A | 11/1999 | Bonyhard | 360/15 |
| 6,014,296 A * | 1/2000 | Ichihara et al. | 360/135 |
| 6,088,200 A | 7/2000 | Morita | 360/135 |
| 6,214,434 B1 * | 4/2001 | Xuan et al. | 428/64.2 |
| 6,309,802 B1 * | 10/2001 | Bar-Gadda | 430/321 |
| 6,347,016 B1 * | 2/2002 | Ishida et al. | 360/17 |
| 6,376,083 B1 | 4/2002 | Murayama et al. | 428/425.9 |
| 6,433,944 B1 | 8/2002 | Nagao et al. | 360/16 |
| 6,469,848 B1 | 10/2002 | Hamada et al. | 360/17 |
| 2002/0054442 A1 | 5/2002 | Nishikawa | 360/17 |

FOREIGN PATENT DOCUMENTS

| | | |
|---|---|---|
| EP | 1 128 363 | 8/2001 |
| GB | 2 164 483 | 3/1986 |
| JP | 49-5610 | 5/1972 |
| JP | 48-53704 | 7/1973 |
| JP | 50-60212 | 5/1975 |
| JP | 51-25723 | 8/1976 |
| JP | 55-12545 | 1/1980 |
| JP | 55-70935 | 5/1980 |
| JP | 56-7243 | 1/1981 |
| JP | 56-22219 | 3/1981 |
| JP | 56-41528 | 4/1981 |
| JP | 56-68926 | 6/1981 |
| JP | 57-8921 | 2/1982 |
| JP | 57-24032 | 2/1982 |
| JP | 57-109133 | 7/1982 |
| JP | 57-109134 | 7/1982 |
| JP | 57-138061 | 8/1982 |
| JP | 57-158004 | 9/1982 |
| JP | 57-158038 | 9/1982 |
| JP | 57-158039 | 9/1982 |
| JP | 57-158040 | 9/1982 |
| JP | 57-158041 | 9/1982 |
| JP | 58-26328 | 2/1983 |
| JP | 58-94136 | 6/1983 |
| JP | 58-94137 | 6/1983 |
| JP | 58-159202 | 9/1983 |
| JP | 60-22733 | 2/1985 |
| JP | 60-209915 | 10/1985 |
| JP | 61-66215 | 4/1986 |
| JP | 61-190719 | 8/1986 |
| JP | 61-210565 | 9/1986 |
| JP | 62-124622 | 6/1987 |
| JP | 62-208430 | 9/1987 |
| JP | 62-264432 | 11/1987 |
| JP | 63-811 | 1/1988 |
| JP | 63-166023 | 7/1988 |
| JP | 63-175229 | 7/1988 |
| JP | 63-183623 | 7/1988 |
| JP | 1-88921 | 4/1989 |
| JP | 64-88921 | 4/1989 |
| JP | 2-94111 | 4/1990 |
| JP | 2-98820 | 4/1990 |
| JP | 2-132630 | 5/1990 |
| JP | 2-214023 | 8/1990 |
| JP | 2-301018 | 12/1990 |
| JP | 3-256223 | 11/1991 |
| JP | 4-13220 | 1/1992 |
| JP | 4-134629 | 5/1992 |
| JP | 4-251435 | 9/1992 |
| JP | 4-251440 | 9/1992 |
| JP | 7-44858 | 2/1995 |
| JP | 7-78337 | 3/1995 |
| JP | 9-138927 | 5/1997 |
| JP | 10-40544 | 2/1998 |
| JP | 10-162360 | 6/1998 |
| JP | 10-269566 | 10/1998 |
| JP | 10-275435 | 10/1998 |
| JP | 11-25455 | 1/1999 |
| JP | 11-175973 | 7/1999 |
| JP | 2001-14667 | 1/2001 |
| WO | 81/00165 | 1/1981 |
| WO | WO 91/16706 | 10/1991 |

* cited by examiner

MASTER INFORMATION SUPPORT

BACKGROUND OF THE INVENTION

1. Field of the Invention

This invention relates to a master information carrier used for static and areal lump-sum recording of digital information signals on a magnetic recording medium.

2. Description of the Related Art

A magnetic reading and reproducing apparatus has been increasing in recording density to realize a small size and large capacity. Especially, in the field of a hard disk drive as a typical magnetic recording device, an a real recording density of more than several gigabits per square inch is already available on the market. Further an areal recording density of ten gigabits per square inch is expected in few years.

One of the primary factors that has enabled such high recording density is the increasing linear recording density, due to improvements of medium properties, head-disk interface performance, and a new signal processing method such as "partial response". However recently the rate of increase-in track density exceeds that of linear recording density, and thus becomes a primary factor for increasing areal recording density. Practical use of a magneto-)resistive type head, which is superior to a conventional inductive type head in reproduction output performance, has contributed to the progress in the track density. It is possible at present to read a signal from a track whose width is at most only a few microns with-good S/N ratio by practical use of the magneto-resistive type head. Further it is expected that a track pitch will reach the sub-micron range in the near future along with further improvement of the head performance.

A tracking servo technique is important for the head to read a signal with high S/N ratio by scanning precisely such a narrow track. For example, a conventional hard disk has areas that are located at predetermined angular intervals over 360 degrees. In those areas information such as a tracking servo signal, address and clock signal is provided (hereinafter referred to as 'preformat'). A magnetic head can scan a track by reading such information at predetermined periods, and monitoring and correcting the head position.

The above-mentioned tracking servo signal, address and clock signal are to be reference signals for the head to scan a track precisely. Therefore, precise record positions are required for these information signals. Current preformat recording into a hard disk is performed precisely by magnetic heads placed in the hard disk drive by using a special servo-track recording apparatus after installing the disk into the drive.

The above-mentioned preformat recording using such a special servo-track recording apparatus has some problems as follows.

The first problem is due to the fact that relative movement between the head and the recording medium is necessary for recording with the magnetic head. This fact means that a substantially long period is required for preformat recording. In addition, the special servo track recording apparatus is expensive. Thus, the cost for preformat recording is quite high.

The second problem is that due to a space between the head and a medium or due to a diffusive recording magnetic field caused by a pole shape of the recording head, the magnetic transition at track edges of the recorded preformat signals lacks steepness. In a current tracking servo technique, the head position is detected by the amount of change in a read signal amplitude when the head missed a track. Therefore, the system requires a steep off-track performance, in which reproduced signal amplitude changes sharply as the head misses the track The diffusive recording magnetic field acts against this requirement, and thus, makes it difficult to realize a precise tracking servo technique that is required for a submicron track recording.

In order to solve the above-mentioned problems in pre-format recording with a magnetic head, Japanese Laid-open Patent Application Tokkai Hei) 10-40544 discloses a new preformat recording technique. In the disclosure, a master information carrier comprising a substrate having an embossed pattern on it is prepared The pattern corresponds to the preformat information signal. At least the protruded portion of the embossed pattern is made of a ferromagnetic material layer. By contacting the surface of the master information carrier with the surface of a magnetic recording medium and applying a magnetic field, the preformat information is recorded in the magnetic recording medium as a magnetized pattern corresponding to the embossed pattern.

According to the disclosure of Tokkai-Hei 10-40544, a ferromagnetic, material composing the protruded portion of a master information carrier surface is magnetized by the applied magnetic field. By the recording magnetic field generated from the magnetized ferromagnetic material, the magnetized pattern corresponding to the embossed surface is recorded on a magnetic recording medium. Thus, the preformat recording of the tracking servo signal, address information signal, read clock signal and other signals is achieved by using the embossed pattern formed on the surface of the master information carrier.

While relative movement between the head and the medium is required for conventional linear recording with a head, the technique of Tokkai Hei 10-40544 is characterized by a static and areal lump-sum recording that does not require relative movement between a master information carrier and a medium. As a result, the technique disclosed in the reference is generally effective for the problems related to preformat recording as follows:

First, the time needed for the preformat recording is substantially shorter as compared to the prior art using a magnetic head. In addition, an expensive servo-track recording apparatus is not necessary for precise position control of the magnetic head. Therefore, the technique disclosed in the reference can improve the productivity of the preformat recording and reduce production costs.

Secondly, a space gap between the master information carrier and the magnetic recording medium can be minimized, since relative movement between them is not required for recording the information signal. In addition, the recording magnetic field for recording does not diffuse, unlike the prior art using a magnetic head. Thus, the magnetic transition at track edges of the recorded preformat signal is steep compared with the recording with a magnetic head. This ensures a precise tracking of a magnetic head in reading data signals from the magnetic recording medium.

In the signal recording process of this technique, the master information carrier and a magnetic recording medium should be contacted with each other securely and uniformly over a large area. Tokkai-Hei 10-269566 discloses a specific recording apparatus to meet this requirement with a function of sucking air between the master information carrier and the magnetic recording medium to secure the contact between them with the pressure of the surrounding atmosphere.

Tokkai-Hei 10-40544 discloses a master information carrier comprising a substrate on which an embossed pattern corresponding to information signals is formed precisley by means of photolithography or the like, and at least the protruded portion of the embossed surface is made of a ferromagnetic material. The master information carrier, however, will be subjected to partial stress intermittently and repeatedly when the preformat recording is performed from the process of sucking air between the master information carrier and magnetic disks being repeated to contact them securely under the pressure of the surrounding atmosphere, by using the recording apparatus disclosed in Tokkai-Hei 10-269566.

Specifically, as the ferromagnetic material at the protruded portion contacts directly and repeatedly with the magnetic disks, the ferromagnetic material will be chipped gradually to lose accuracy in the embossed shape. When the chipping of the ferromagnetic material becomes serious, the recording signals will be lost or the magnetic disks will be damaged.

In view of these facts, the master information carrier disclosed in Tokkai-Hei 10-40544 requires improved durability. The master information carrier is required to allow repetition of good preformat recording without losing recording signals or damage to the magnetic disks, i.e., the master information carrier should have a long life, because the life affects the number of recordings that can be made using the master information carrier.

SUMMARY OF THE INVENTION

In view of the above-mentioned problems of conventional techniques, it is an object of this invention to provide a long-life master information carrier having excellent durability for the repetition of recording steps involving pressure-contact with a magnetic recording medium.

A master information carrier with a first type configuration of this invention comprises a non-magnetic substrate on which a ferromagnetic film is provided in an embossed pattern Protrusions of the embossed pattern composed of a ferromagnetic film correspond to a disposition of digital information signals. Recessed portion of the embossed pattern is filled with a non-magnetic solid material.

A master information carrier with a second type configuration of this invention comprises a non-magnetic substrate having an embossed pattern. Recessed portion of the embossed pattern corresponds to a disposition of digital information signals. A ferromagnetic film is filled in recessed portion of the embossed pattern.

According to the present invention, the embossed pattern of the ferromagnetic film is protected by the non-magnetic material, and the edge portion of the ferromagnetic film's pattern is hardly chipped. Therefore, the master information carrier can have an improved durability and a long life, i.e., the number of times of recording per one master information carrier can be increased. As a result, the technique for static and areal lump sum recording disclosed in Tokkai-Hei 10-40544 and Tokkai-Hei 10-269566 can be conducted at a still lower cost with a still higher productivity.

DESCRIPTION OF THE PREFERRED EMBODIMENTS

Figure 7:
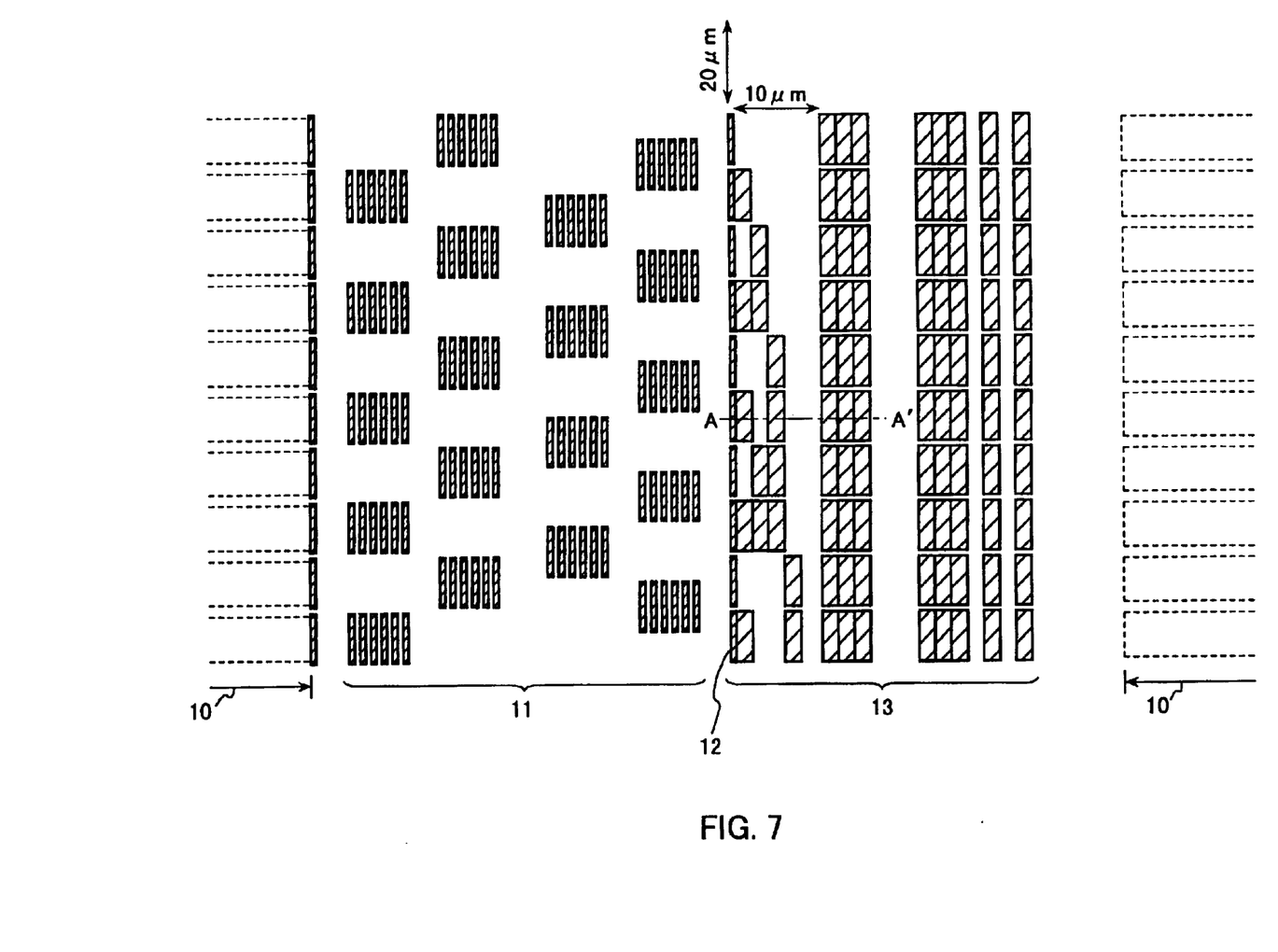
FIG. 7 is a plan view showing an example of a pattern of a ferromagnetic film formed on a master information carrier according to the present invention.

FIG. 7 shows an example of a configuration of a ferromagnetic film pattern formed on a master information disk according to the present invention. This figure shows a master information pattern to be recorded in a preformat area of a magnetic recording disk that occupies ten tracks in the radial direction, i.e., the track width direction, of the disk. The preformat area is disposed at a predetermined angular interval along the circumferential direction of the disk, i.e., the track length direction. In FIG. 7, areas defined by broken lines correspond to tracks to be used as data areas 10 in the magnetic recording medium after recording the master information signal. In the real master information carrier, such master information patterns shown in FIG. 7 are disposed at a predetermined angular interval and in all tracks over the whole recording area of the magnetic recording disk.

The master information pattern comprises a tracking servo signal area 11, a clock signal area 12 and address signal area 13 that are disposed sequentially along the track direction as shown in FIG. 7. The master information carrier according to the present invention has a pattern formed with a ferromagnetic film to correspond to the disposed information pattern. Each rectangle member with hatching is made, for example, of a ferromagnetic film.

In the following first to third embodiments, the areal configuration exemplified in FIG. 7 can be provided respectively.

First Embodiment

Figure 1:
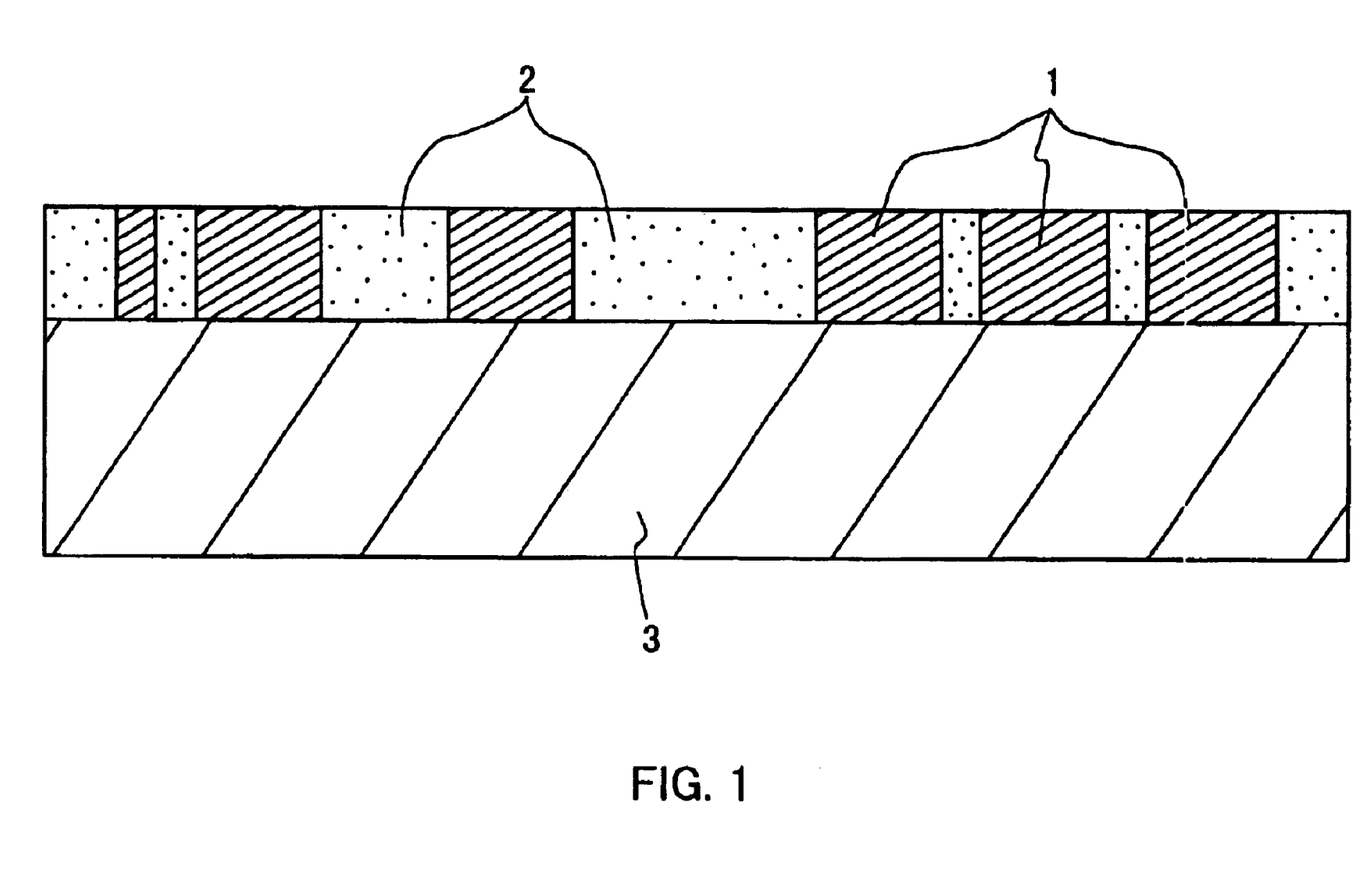
FIG. 1 is a cross sectional view showing a master information carrier along the direction of bit length in the first embodiment of the invention.
Figure 6:
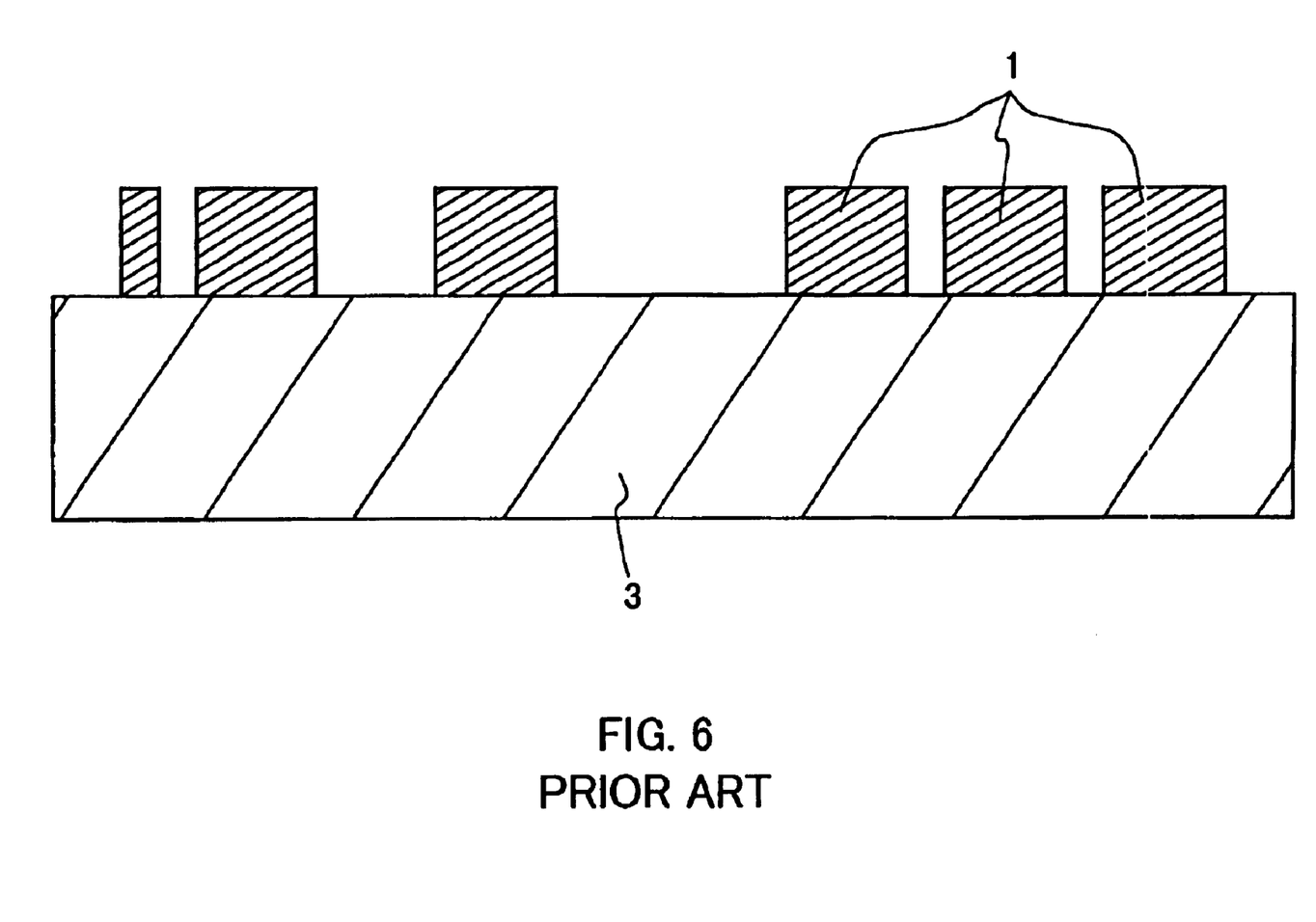
FIG. 6 is a cross sectional view showing a conventional master information it carrier along the direction of bit length.

FIG. 1 shows a cross section of a master information carrier with a first type configuration in the bit length direction (track length direction) taken along a phantom line A—A' in FIG. 7. A ferromagnetic film 1 with a fine embossed pattern is formed on a non-magnetic substrate 3. In recessed portions of the embossed pattern of the ferromagnetic film 1, a non-magnetic solid material 2 is filled. FIG. 6 shows a conventional master information carrier disclosed in Tokkai-Hei 10-405446 for comparison with FIG. 1. In the conventional example shown in FIG. 6, no material is filled in the recessed portions of the embossed pattern of the ferromagnetic film 1.

The master information carrier shown in FIG. 6 can be formed, for example, by depositing a ferromagnetic film 1 on a planar non-magnetic substrate 3, then applying a photoresist film thereon, then exposing and developing the photoresist film to be embossed in a pattern corresponding to digital information signals, and subsequently carrying out a dry-etching such as an ion-milling to form a fine embossed pattern on the ferromagnetic film 1, followed by removal of the remaining photoresist film.

When the conventional master information carrier shown in FIG. 6 is repeatedly used for recording on magnetic recording medium, partial stress is applied repeatedly and intermittently, especially to the edges of the protruded portion of the ferromagnetic film surface. As a result, the edges of the ferromagnetic film pattern will be chipped gradually, and the accuracy of the embossed pattern will be lost. When the chipping of the ferromagnetic film is serious, the recording signals may be lost in the end.

In the master information carrier with the first type configuration shown in FIG. 1, the edges of the ferromagnetic film 1 are protected by the non-magnetic solid material 2. Therefore, partial stress applied to the edges of the pattern of the ferromagnetic film 1 when the master information carrier is contacted securely and repeatedly with magnetic disks for recording by using the atmospheric pressure is relieved, and thus, the ferromagnetic film 1 can be prevented from being chipped. As a result, one master information carrier can be used for the recording of a considerable number of disks-compared to conventional master information carriers, and thus, the life of the master information carrier can be extended.

The master information carrier with the first type configuration shown in FIG. 1 can be manufactured, for example, by the following steps of:

depositing a ferromagnetic film 1 on a planar non-magnetic substrate 3 and applying a photoresist film thereon;

exposing and developing the photoresist film to provide an embossed pattern corresponding to digital information signals;

forming a fine embossed pattern on the ferromagnetic film 1 by a dry-etching such as an ion etching, using the patterned photoresist film as a mask;

depositing a non-magnetic solid material 2 by any application technique such as vapor deposition including sputtering and vacuum evaporation, plating, or spin-coating; and removing with a chemical solution the remaining photoresist film and a extra non-magnetic solid material layer deposited thereon. The chemical solution treatment can be replaced by mechanical polishing.

In order to minimize the partial stress applied to the ferromagnetic film 1 and maximizing the effect in preventing the chipping, the ferromagnetic film 1 and the non-magnetic solid material 2 preferably have the same thickness to minimize the difference between them so that the surface of the master information carrier becomes flat.

The material used as the non-magnetic solid material 2 for the master information carrier with the first type configuration preferably has a low solid-solubility with the material of the ferromagnetic film 1. When the materials have a high solid-solubility with each other, the magnetic property of the ferromagnetic film 1 will deteriorate due to diffusion at the interface between the ferromagnetic material 1 and the non-magnetic solid material 2. It may degrade the recording performance of the master information carrier. In general, the ferromagnetic film 1 is made of Co, Fe, or an alloy comprising mainly these metals. Therefore, suitable materials having a low solid solubility with these metal films include films of oxides such as $SiO_2$ and $Al_2O_3$, and metal films such as Cu, Ag, or an alloy mainly comprising these metal. These films can be formed by vapor deposition such as sputtering and vacuum evaporation.

Polymer materials such as polyimide can also be used for the non-magnetic solid materials. Such a polymer layer can be formed, for example, by diluting a commercially-obtainable polyimide solution with a solvent like cyclohexanol to have a proper concentration, applying the solution with a spin-coater before curing at a high temperature. Since these polymer materials are resilient or flexible, the non-magnetic solid material 2 containing these materials functions as a buffer in the recessed portions of the ferromagnetic film 1. As a result, the partial stress applied to the edges of the ferromagnetic film at recording can be relieved more efficiently.

Figure 2:
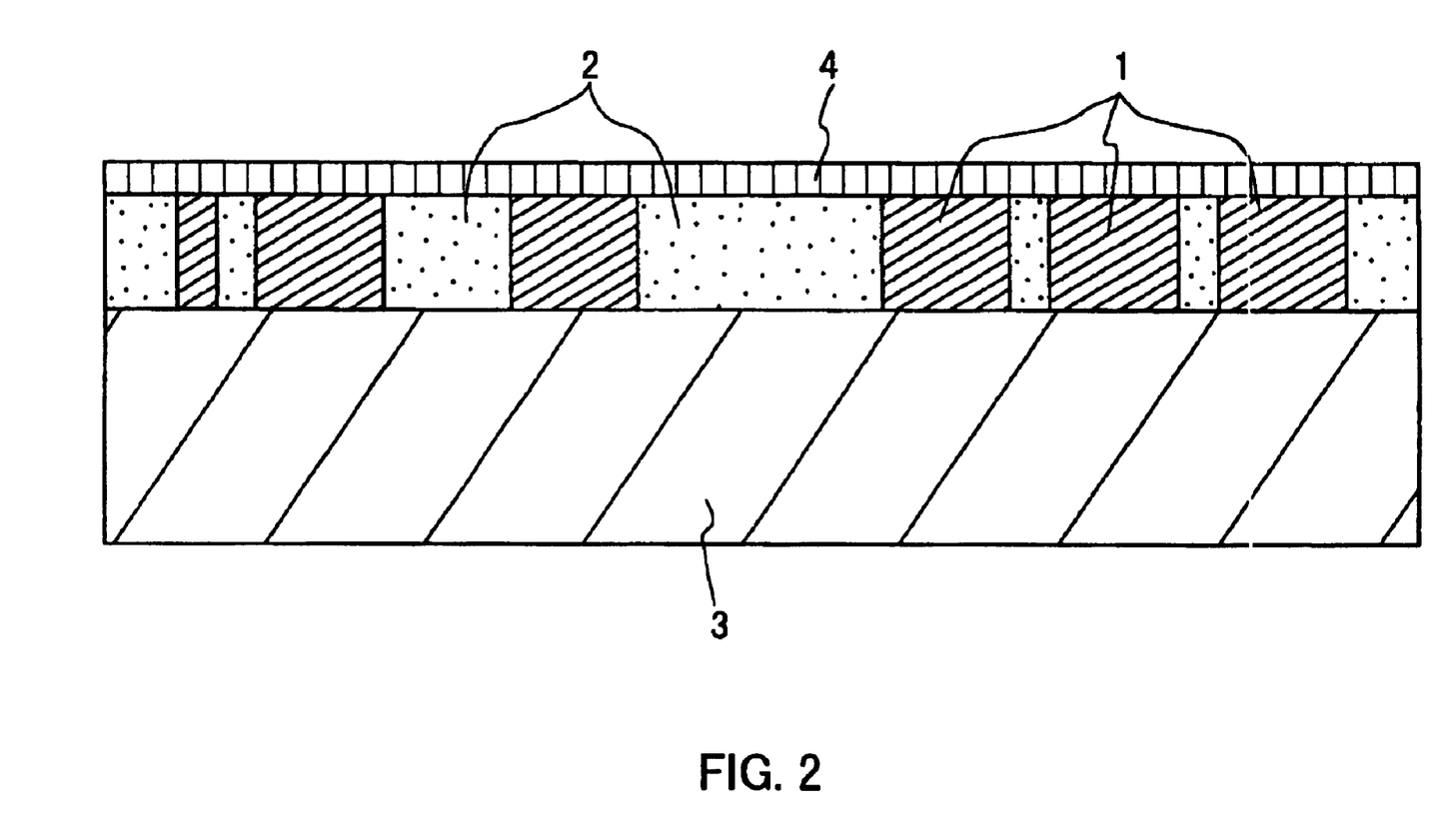
FIG. 2 is a cross sectional view showing a master information carrier along the direction of bit length in a variation of the first embodiment of the invention.

The master information carrier with a first type configuration can have a longer life by forming a hard protective film 4 on the ferromagnetic film 1 and non-magnetic solid material 2, as shown in FIG. 2. However, the hard protective film 4 cannot be too thick, since the gap between the master information carrier and magnetic recording medium is increased at signal recording, and spacing loss will be increased. In a preformat recording on magnetic disks as a typical application example of the invention, the recording wavelength of the signals is typically about 0.3 $\mu$m or more. The allowable thickness for the hard protective film is about 20 nm or less in view of recording spacing loss for the recording wavelength. Even for a thickness within that range, the life of a master information carrier can be extended sufficiently.

Films suitable for the hard protective film 4 include a C film, a B film, an $SiO_2$ film and the like in view of the hardness. These films can be formed by a normal vapor deposition such as sputtering or vacuum evaporation.

When the hard protective film 4 has some electric conductivity, the reliability at recording can be further improved. A master information carrier covered with an insulating material will gather dust particles due to static electricity. Since these dust particles will increase gaps between the master information carrier and magnetic recording medium at recording, resulting in deterioration of the recording performance, they should be removed properly prior to contacting the master information carrier with the surface of the magnetic recording medium.

Since a conductive hard protective film 4 gathers less dust particles due to static electricity, removal of dust particles can be simplified and reliable recording can be obtained easily. From this point of view, a C film fabricated by sputtering is the most suitable for the hard protective film 4, since such a film has a sufficient hardness required to be a protective film and a conductivity to control dust adhesion. Although a B film and an $SiO_2$ film have sufficient hardness, they cannot provide sufficient effects to prevent dust adhesion because of their high insulating properties. Another kind of C-based film comprising a diamond structure, fabricated by a method such as plasma CVD is harder than a sputtered carbon film. However, it cannot provide considerable effects to prevent adhesion of dust particles because of its relatively high insulation properties.

Second Embodiment

Figure 3:
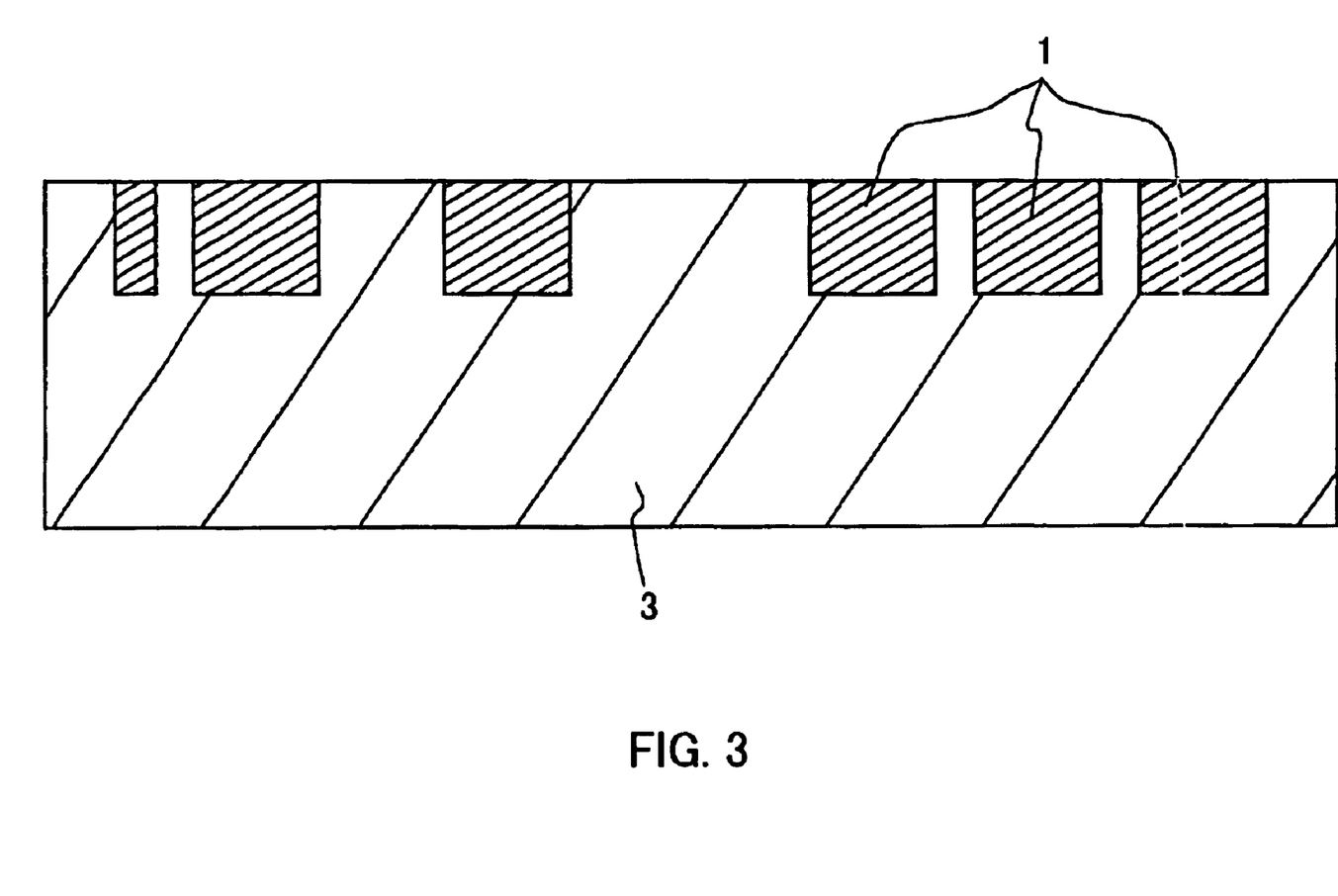
FIG. 3 is a cross sectional view showing a master information carrier along the direction of bit length in the second embodiment of the invention.

FIG. 3 shows an example of a cross section of a master information carrier with a second type configuration in the direction of bit length (track length direction) taken along a phantom line A–A' in FIG. 7. In this configuration, the ferromagnetic film 1 is embedded in the recessed portions of the non-magnetic substrate 3. The recessed portions of the non-magnetic substrate 3 have a pattern corresponding to the disposition of digital information signals, so that the embedded ferromagnetic film is also patterned to correspond to the digital information signals.

In the master information carrier shown in FIG. 3, the edges of the ferromagnetic film 1 are protected by the non-magnetic substrate 3. Therefore, partial stress applied to the edges can be relieved when the master information carrier is contacted repeatedly and securely with the magnetic disks by using the atmospheric pressure, and thus, the ferromagnetic film 1 can be prevented from being chipped. As a result, similar to the first type configuration, one master information carrier can be used for a considerable number of times of recording media compared with a conventional configuration, and thus, the master information carrier can have a longer life.

The master information carrier with the second type configuration shown in FIG. 3 can be manufactured, for example, by the following process comprising the steps of:

applying a photoresist film on a planar non-magnetic substrate 3;

exposing and developing the photoresist film to form an embossed pattern corresponding to digital information signals;

forming a fine embossed pattern on the non-magnetic substrate 3 by a dry-etching process such as an ion etching, using the patterned photoresist film as a mask;

depositing the ferromagnetic film 1 by any suitable techniques such as vapor deposition including sputtering and vacuum evaporation, or plating; and subsequently removing with a chemical solution such as a remover the remaining photoresist film and the extra ferromagnetic film 1 deposited thereon. The chemical solution treatment can be replaced by mechanical polishing. Alternatively, the chemical solution treatment and polishing can be carried out at the same time.

Similar, to the first type configuration, a thickness of the ferromagnetic film 1 is preferably matched with a depth of the recess of the non-magnetic substrate 2 in order to minimize the surface height difference at the interface and to flatten the master information carrier surface at this portion, for minimizing the partial stress applied to the ferromagnetic film 1 and maximizing the effect in preventing chipping.

In the second type configuration, the material used as the non-magnetic substrates 3 preferably has a low solid-solubility with the material of the ferromagnetic film 1. When the materials have a high solid-solubility with each other, the magnetic property of the ferromagnetic film 1 deteriorates due to diffusion at the interface between the ferromagnetic material 1 and the non-magnetic substrate 3. It may degrade the recording performance of the master information carrier. Moreover in view of industrial value, a substrate is preferably selected from materials sufficiently supplied at a low price. Non-magnetic substrate materials meeting the above requirements include oxides such as $SiO_2$ and $Al_2O_3$, Si, and C.

When forming an embossed pattern on the non-magnetic substrate 3 by dry-etching with the above-mentioned substrate materials, a proper reactive gas can be introduced for processing by reactive ion etching. The reactive ion etching is remarkably superior to a normal ion etching using no reactive gas in easy control of anisotropy and speed of the etching. So the reactive ion etching can provide an additional effect, that is, a pattern can be formed in a faster and accurate manner. For example, a $CF_4$ gas can be used as a reactive gas when the non-magnetic substrate comprises Si.

In this case, the photoresist film can be replaced by a Cr film as a mask for etching. Namely, an embossed pattern composed of a Cr film and corresponding to digital information signals is formed on the non-magnetic substrate 3 to etch the non-magnetic substrate 3 by using the Cr film as a mask. When the non-magnetic substrate 3 comprising Si or the like is processed by reactive ion etching, the Cr film is remarkably superior to a photoresist film in selectivity. As a result, the Cr film functioning as a mask can be thin compared to a photoresist film, and thus, the pattern can be formed with improved precision. When a Cr film is used as a mask, the Cr film and the unnecessary ferromagnetic film thereon are difficult to remove by treating only with a chemical solution like a remover after forming the ferromagnetic film 1. Mechanical polishing, or chemical polishing such as chemical mechanical polish (CMP) should be conducted.

Third Embodiment

Figure 4:
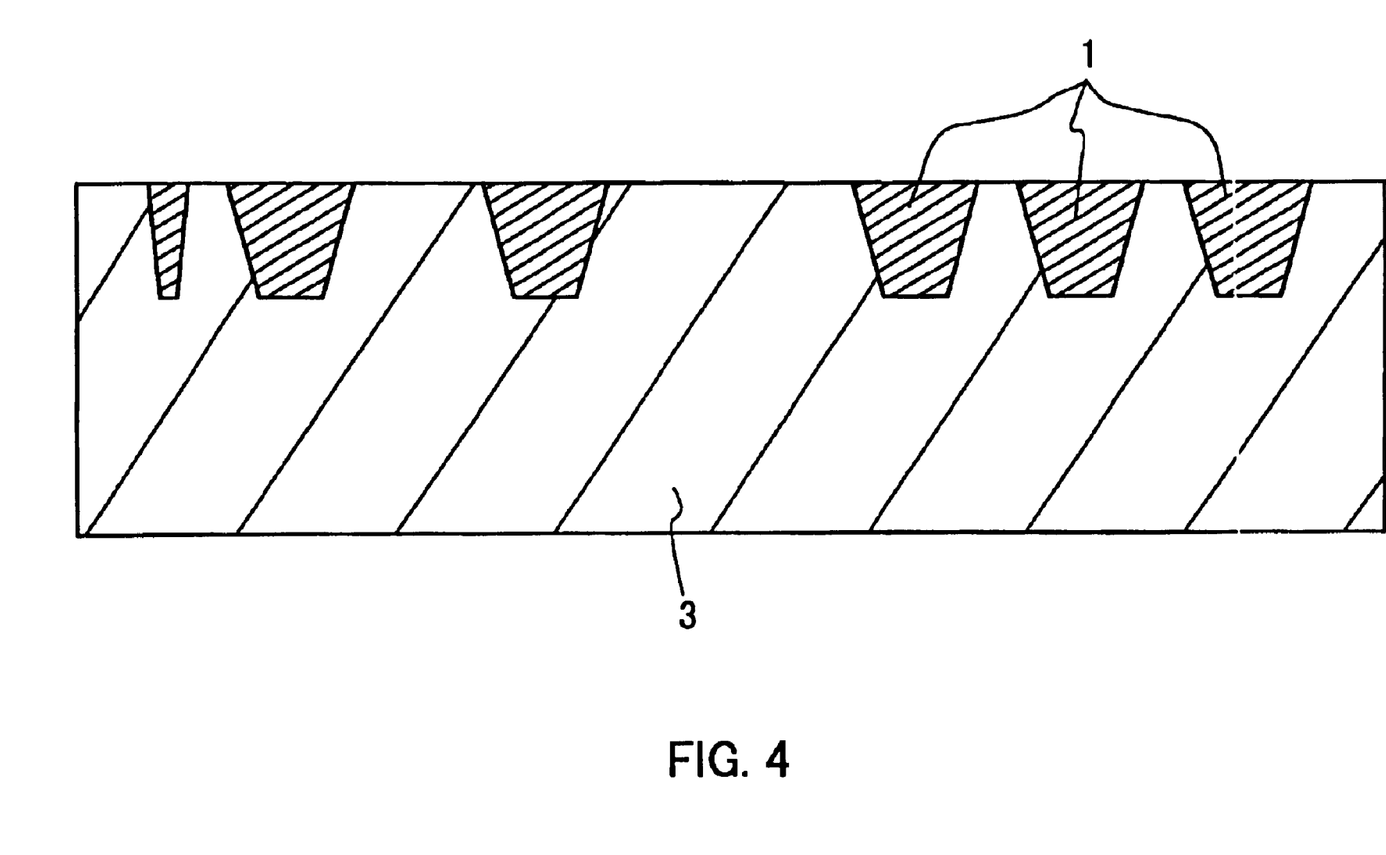
FIG. 4 is a cross sectional view showing a master information carrier along the direction of bit length in the third embodiment of the invention.

FIG. 4 shows a cross section of another master information carrier with the second type configuration in the direction of bit length (along a phantom line A–A') of the ferromagnetic film pattern shown in FIG. 7.

The feature of the configuration shown in FIG. 4 is that the cross-sectional shape of the ferromagnetic film 1 in the direction of bit length is a substantial trapezoid with an upper side at the surface and a lower side on the substrate, where the upper side is longer than the lower side. Such a master information carrier can improve the recording performance remarkably. The reason can be explained as follows.

When signals are recorded in an inplane magnetic recording medium, the ferromagnetic film 1 of the master information carrier is magnetized in the direction of bit length (the lateral direction in FIG. 4) of the film plane, and generates leakage flux from the slopes and both edges of the lower and upper sides of the trapezoidal cross section. Particularly, the flux leaked from the vicinity of the upper edges to the master information carrier surface contributes to the recording magnetic field into the magnetic recording medium. The recording performance of the master information carrier is affected by the intensity of the recording magnetic field generated by the ferromagnetic film 1 and also the magnetic field gradient in the vicinity of the upper edges at the ferromagnetic film surface.

If the upper side of the ferromagnetic film 1 is shorter than the lower side in the cross section, the sloped sides of the film's edges will face to the surface of the master information carrier. In such a case, leakage flux generated from these sides will reach the surface of the master information carrier and act as a recording magnetic field, resulting in the lowering of magnetic field gradient in the direction of the bit length in the vicinity of the upper edges at the ferromagnetic film surface. In the embodiment shown in FIG. 4 where the upper side is longer than the lower side, the sloped sides at the edges of the ferromagnetic film face toward the substrate (the lower part in FIG. 4). In this case, the leakage flux generated from the sloped sides cannot easily reach the surface of the master information carrier. Therefore, at the interface with the non-magnetic substrate material in the vicinity of the upper edges, a steep magnetic field gradient can be constantly obtained, and thus, excellent recording performance can be provided.

Moreover, when the upper side is longer than the lower side in the cross section, the magnetic flux is considered to concentrate easily at the upper side rather than the lower side in the vicinity of the edges of the ferromagnetic film 1 in the direction of the bit length (the lateral direction in FIG. 4). As a result, leakage flux from the vicinity of the upper edges is increased compared to ferromagnetic films with rectangular cross sections shown in FIGS. 1–3, and thus, sufficient recording performance can be obtained easily.

In a master information carrier having the first type configuration, a non-magnetic solid material 2 should be filled in the recessed portions of the ferromagnetic film pattern after patterning the ferromagnetic film 1. If the ferromagnetic film 1 is a trapezoid in the cross section as mentioned above, it may be difficult to fill the non-magnetic solid material 2 without leaving gaps in the recessed portions of the ferromagnetic film pattern in order to obtain sufficient durability. According to the embodiment of FIG. 4, such a ferromagnetic film with a trapezoidal cross section can be obtained more easily than the first type configuration.

Figure 5:
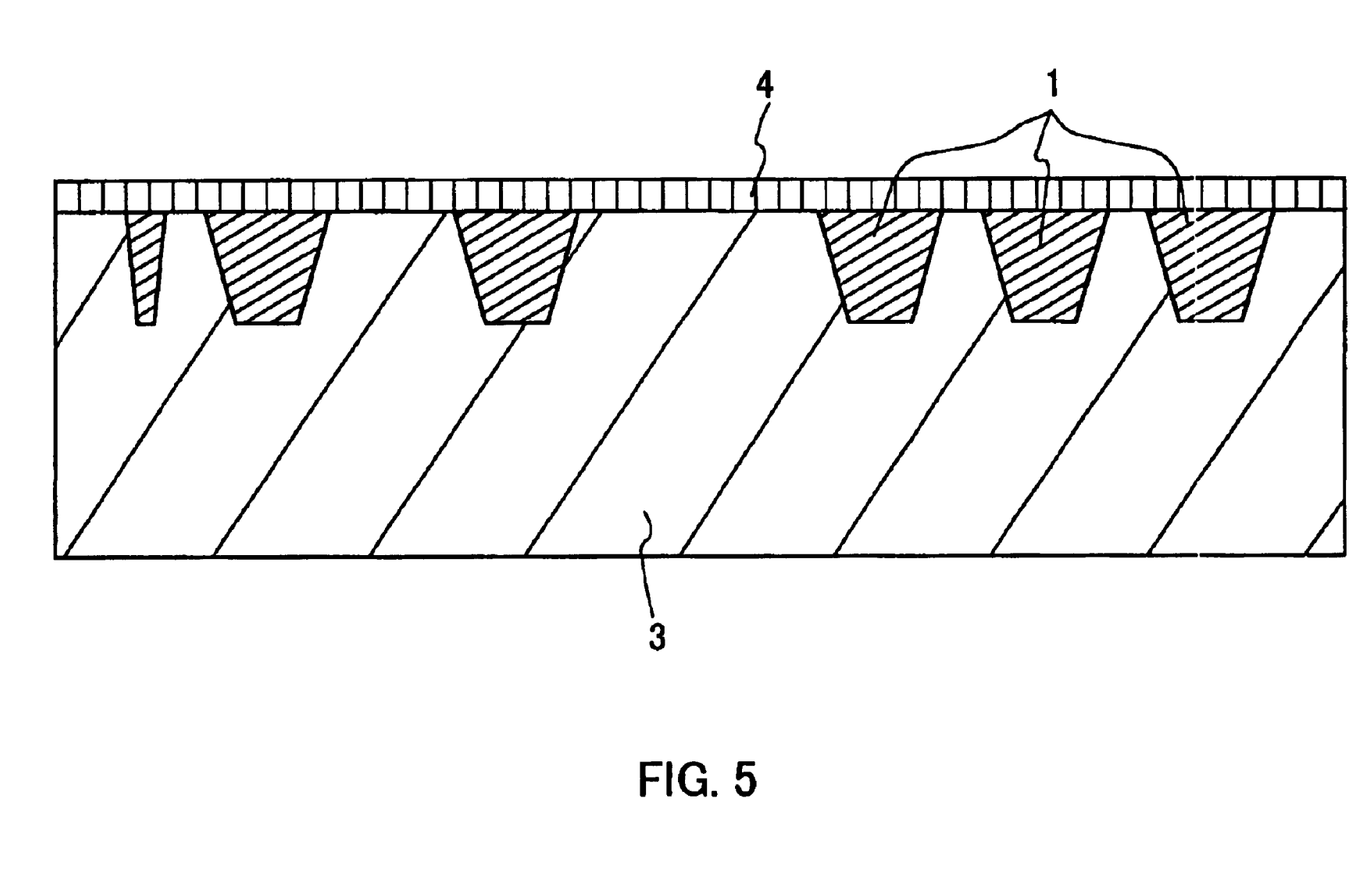
FIG. 5 is a cross sectional view showing a master information carrier along the direction of bit length in a variation of the third embodiment of the invention.

FIG. 5 shows an example of a master information carrier basically having the configuration shown in FIG. 4, where a hard protective film 4 is further formed on the surface of the ferromagnetic film 1 and non-magnetic substrate 3. Similar to the first embodiment, a master information carrier with this configuration can have a longer life due to a hard protective film 4.

Durability was evaluated for the master information carriers with the configurations exemplified in the first to third embodiments and a master information carrier having the conventional configuration shown in FIG. 6, by repeatedly recording signals with the recording apparatus disclosed in Tokkai-Hei 10-269566. As a result, the master information carrier with the conventional configuration shown in FIG. 6 had a loss of the signals after about 5,000 times of recording. Signals were not lost even after 50,000 times of recording for the master information carriers shown in FIGS. 1, 3, and 4, or even after 100,000 times of recording for the master information carriers shown in FIGS. 2 and 5 of this invention. This evaluation showed that the configurations of this invention can improve the durability of master information carriers and provide a long life regarding the number of recordings.

This invention can be applied to various kinds of apparatus. While the above description is focused on applications of magnetic disk installed in hard disk drives or the like, this invention is not limited thereto but can be applied to magnetic recording media such as flexible magnetic disks, magnetic cards, and magnetic tapes or the like to attain similar effects.

With regard to information signals recorded in the magnetic recording medium, the description of this invention is focused on preformat signals such as tracking servo signal, address signal, and read clock signal. This invention, however, is not limited thereto but can be used in principle to record various data signals and audio and video signals. In such a case, recorded magnetic disks can produced on a large scale easily by using the technique to record on magnetic recording medium with the master information carriers of this invention in order to provide them at a low cost.

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A master information carrier used for recording information signals on a magnetic recording medium, comprising a non-magnetic substrate; a pattern of a ferromagnetic film which is disposed on the surface of the non-magnetic substrate, the pattern being disposed in the track length direction so as to correspond to uniform and non-uniform arrangements of the information signals; and a non-magnetic solid material filled in portions between respective neighboring ferromagnetic film areas composing the pattern, top surfaces of the ferromagnetic films and the non-magnetic solid material forming a substantially flat surface, wherein the ferromagnetic film comprises a material selected from the group consisting of Co, Fe, and an alloy comprising Co or Fe as the main component, and the non-magnetic solid material is selected from the group consisting of $SiO_2$, $Al_2O_3$, Cu, Ag and an alloy comprising Cu or Ag as the main component.

2. A master information carrier used for recording information signals on a magnetic recording medium, comprising a non-magnetic substrate having an embossed surface that forms a pattern of recessed portions, the pattern being disposed in the track length direction so as to correspond to uniform and non-uniform arrangements of the information signals; and a ferromagnetic film filled in the recessed portions of the pattern, top surfaces of the non-magnetic substrate and the ferromagnetic films forming a substantially flat surface, wherein the ferromagnetic film comprises a material selected from the group consisting of Co, Fe, and an alloy comprising Co or Fe as the main component and the non-magnetic substrate comprises a material selected from the group consisting of $SiO_2$, $Al_2O_3$, Si, and C.

3. A method of manufacturing a magnetic recording medium comprising: bringing the master information carrier according to claim 1 into contact with the magnetic recording medium; and applying a magnetic field, whereby the magnetic recording medium is recorded a magnetized pattern corresponding the pattern formed on the master information carrier.

4. A method of manufacturing a magnetic recording medium comprising: bringing the master information carrier according to claim 2 into contact with the magnetic recording medium; and applying a magnetic field, whereby the magnetic recording medium is recorded a magnetized pattern corresponding the pattern formed on the master information carrier.

5. A master information carrier used for recording information signals on a magnetic recording medium, comprising a non-magnetic substrate; a pattern of ferromagnetic film which is disposed on the surface of the non-magnetic substrate, the pattern being disposed in the track length direction so as to correspond to uniform and non-uniform arrangements of the information signals; and a non-magnetic solid materials filled in portions between the respective neighboring ferromagnetic films areas composing the pattern, top surfaces of the ferromagnetic films and the non-magnetic solid material forming a substantially flat surface wherein the ferromagnetic film comprises a material selected from the group consisting of Co, Fe, and an alloy comprising Co or Fe as the main component, and the non-magnetic solid material comprises a polymer material.

6. A master information carrier according to claim 5, wherein the polymer material is formed by diluting polyimide in a solvent to prepare a polyimide solution, spincoating the polyimide solution, and curing it with heat.

7. A master information carrier according to claim 1, wherein a protective film is formed on the surface of said ferromagnetic film and said non-magnetic solid material.

8. A master information carrier according to claim 7, wherein the protective film comprises carbon as the main component formed by sputtering.

9. A master information carrier according to claim 2, wherein the cross section of said ferromagnetic film in a bit length direction of the information signals has a substantially trapezoidal shape with an upper side at the surface that is longer than a lower side on the substrate.

10. A master information carrier according to claim 2, wherein a protective film is formed on the surface of said substrate and said ferromagnetic film filled in the recessed portions.

11. A master information carrier according to claim 10, wherein said protective film comprises carbon as the main component formed by sputtering.

12. A master information carrier according to claim 7, wherein the protective film has a thickness of 20 nm or less.

13. A master information carrier according to claim 7, wherein the protective film is electrically conductive.

14. A master information carrier according to claim 10, wherein the protective film has a thickness of 20 nm or less.

* * * * *